March 6, 1928. 1,661,964
M. RUDIC
GAS RANGE CLOSURE CASING
Filed Nov. 12, 1926 2 Sheets-Sheet 2
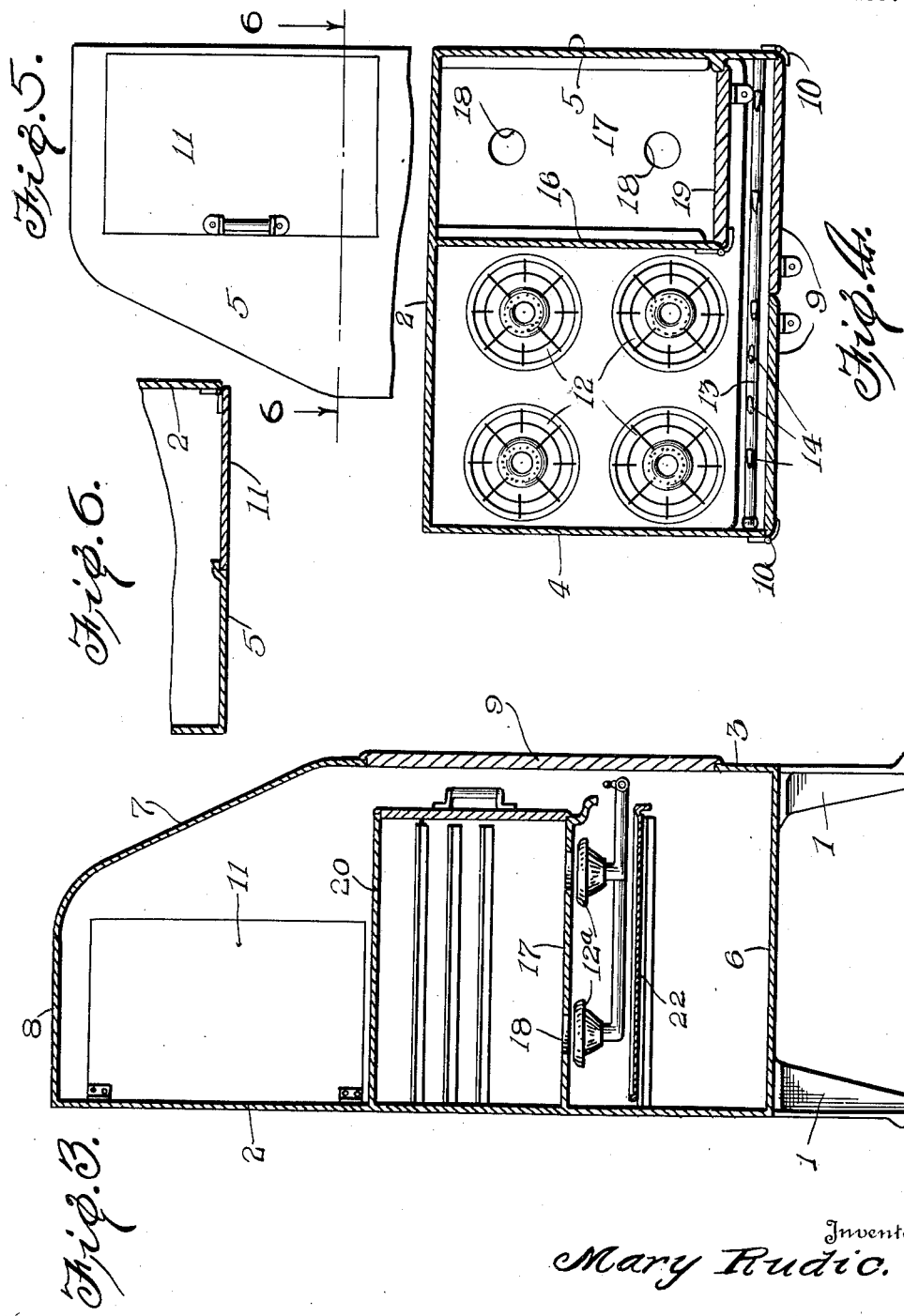
Inventor
Mary Rudic.
By Bryant & Lowry
Attorneys Patented Mar. 6, 1928.

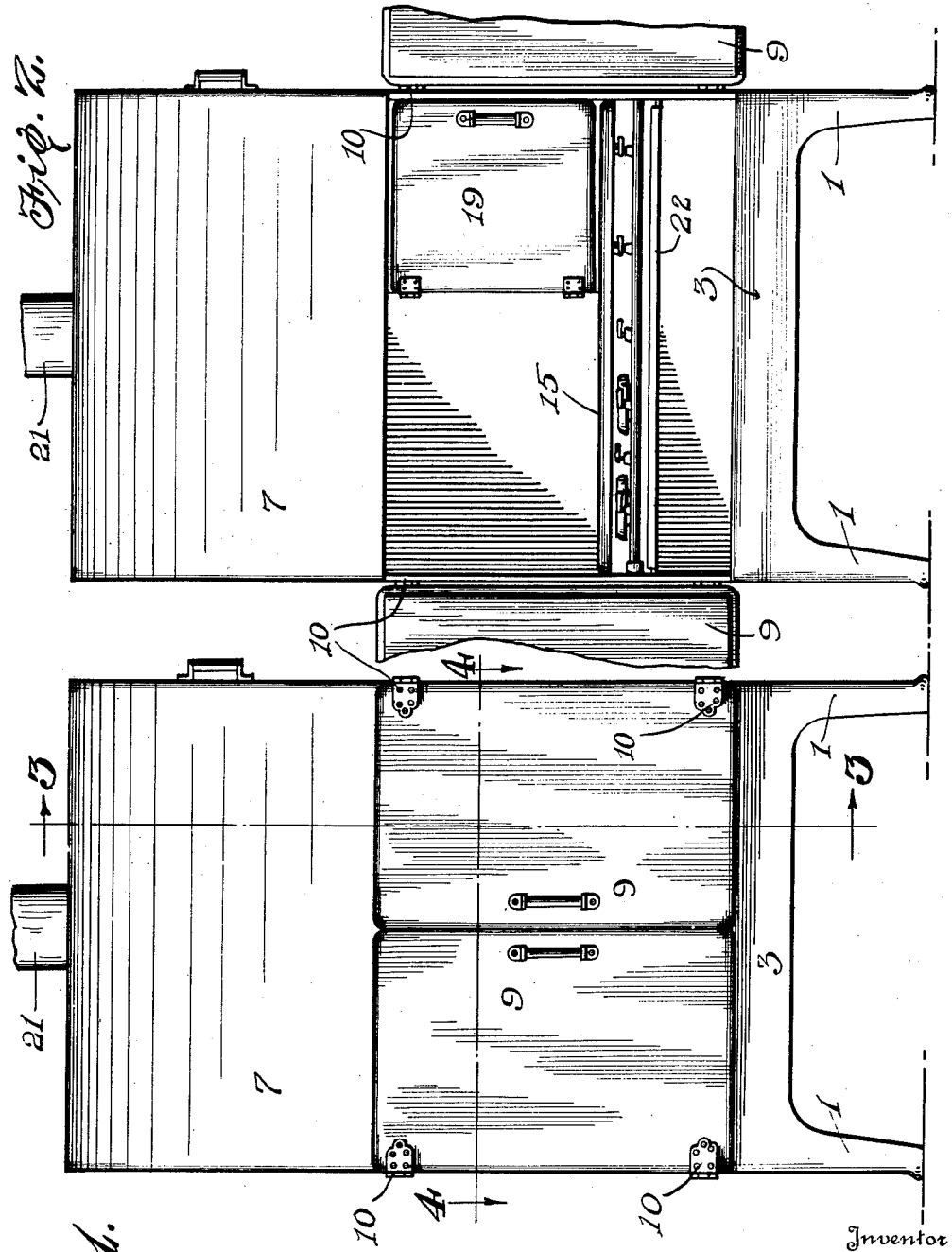

1,661,964

UNITED STATES PATENT OFFICE.

MARY RUDIC, OF PHILADELPHIA, PENNSYLVANIA.

GAS-RANGE CLOSURE CASING.

Application filed November 12, 1926. Serial No. 147,994.

This invention relates to certain new and useful improvements in gas range closure casings and has for its primary object to provide an inclosed casing structure for a gas range with an outlet pipe or conduit at the upper end of the casing so that odors and fumes from cooking will be delivered through the conduit to a chimney or other outlet for removing all odors of cooking from a room or building.

A further object of the invention is to provide a gas range closure casing wherein the upper portion of the front wall of the closure casing is inclined upwardly and rearwardly for directing the fumes from cooking to an outlet conduit in communication with a chimney or the like, the gas range structure comprising the usual hot plates or burners with a laterally disposed bake oven and a warming compartment above the bake oven rendered accessible by a door formed in the side wall of the casing structure.

A further object of the invention is to provide a gas range closure of the above type wherein the completely closed casing is accessible to the burners and oven thereof by the provision of a pair of front doors while access to the heating compartment is rendered accessible by an end door.

With the above and other objects in view that will become apparent as the nature of the invention is better understood, the same consists in the novel form, combination and arrangement of parts hereinafter more fully described, shown in the accompanying drawings and claimed.

In the drawings, wherein like reference characters are employed to indicate corresponding parts throughout the several views, Figure 1 is a front elevational view showing an inclosing casing for a gas range with the double doors in the front wall thereof positioned forwardly of the range structure or hot plates and baking oven;

Figure 2 is a similar front elevational view showing the two front doors in open position and broken away with the baking oven positioned laterally of the hot plates;

Figure 3 is a vertical cross-sectional view taken on line 3—3 of Figure 1 showing the rearwardly inclined upper front portion of the front wall of the casing, the baking oven and burners beneath the same, and the door closure in the end wall of the casing for the warming compartment above the oven;

Figure 4 is a horizontal sectional view taken on line 4—4 of Figure 1;

Figure 5 is a fragmentary end elevational view of the upper end of the casing showing the door closure for the warming compartment above the oven; and Figure 6 is a horizontal sectional view taken on line 6—6 of Figure 5.

The primary object of this invention being to provide an inclosing casing for a gas range to confine odors, fumes and steam arising during cooking and directing the same outwardly of the room or building, the casing for the gas range that is mounted upon the corner supporting legs 1 is of rectangular formation in horizontal section and comprises a rear wall 2, a front wall 3, end walls 4 and 5 and a bottom wall 6. The upper portion of the front wall 3 is inclined upwardly and rearwardly as at 7 and merges into the top wall 8. The front wall 3 of the casing has a relatively large opening that is closed by the two horizontally swinging doors 9 that are hinged to the side walls 4 and 5 as at 10. The upper end of the casing constitutes a warming compartment and access thereto is had through an opening in the side wall 5 that is closed by the door 11.

The area within the casing horizontally aligned with the opening in the front wall 3 that is closed by the doors 9 has the gas range structure located therein, said range comprising a plurality of burners 12—12$^a$ having pipe connections with the gas pipe 13 with each burner independently controlled by a valve 14. The burners 12 are located at one side of the casing beneath the plate 15 as shown in Figure 2 while a baking oven 16 is horizontally aligned therewith at the opposite side of the casing adjacent the side wall 5. The bottom wall 17 of the baking oven 16 is provided with openings 18 beneath which the burners 12$^a$ are disposed as shown in Figure 3, the front side of the oven 16 being closed by the horizontally swinging hinged door 19 shown in Figures 2 and 4. The top wall 20 of the baking oven forms a support for warming foods, dishes or the like and access thereto is had through the side door 11. As shown in Figures 1 and 2, the top wall 8 of the casing has an outlet flue 21 that leads to a chimney or the like for carrying off the fumes during cooking.

A drip pan 22 is supported beneath the burners and oven and the area between the drip pan and casing bottom 6 forms a compartment for pots, pans or the like. Access is had to this compartment through the front door opening and the pans etc., are maintained in a clean sanitary condition by confinement within the casing.

From the above detailed description of the invention, it is believed that the construction and operation thereof will at once be apparent, it being noted that the casing structure enclosing the gas range confines objectionable odors, fumes and steam or the like during cooking therein and directs the same through the outlet flue 21 to a point exteriorly of the room or building. The front closure doors 9 for the casing control access to the gas range and baking oven while access to the latter is had by way of the door 19. The inclined portion 7 at the upper end of the front wall 3 directs the vapors arising during cooking to the upper end of the casing for passage through the outlet flue 21. The casing structure is highly sanitary in its use and the cooking of any foods is accomplished with odors eminating therefrom being prevented from entering the room in which the gas range is located.

While there is herein shown and described the preferred embodiment of the invention, it is nevertheless to be understood that minor changes may be made therein without departing from the spirit and scope of the invention as claimed.

What I claim as new is:—

1. A gas range comprising a metallic casing of rectangular form, composed of front and rear walls, and top and bottom plates, mounted on standards above the floor and containing an oven having an open front and hinged door, gas burners located below said oven and a drip pan located below said burners, said casing enclosing all the essential elements of a gas range and forming a gas tight shield therefor, having an outlet for vapor, the rear wall forming the back wall of the oven, and the support for the drip pan, said casing extending above the oven and providing capacious warming spaces above and below the oven and drip pan, said casing having a door in front and an opening in the front wall closed by said door, said compartment being also formed with a door closed opening for access to the space above the oven.

2. A combined gas range and vapor shield consisting of a substantially gas tight rectangular metallic casing mounted on legs and having an outlet flue at its upper portion and a door way in its front wall closed by a hinged door a rectangular oven supported by said back wall, a series of burners below said oven, the floor of which is formed with flame openings, said casing extending above and below the oven and burners and providing upper and lower heating chambers accessible from the exterior of the casing.

In testimony whereof I affix my signature.

MARY RUDIC.